United States Patent [19]

Beecher

[11] Patent Number: 4,488,790
[45] Date of Patent: Dec. 18, 1984

[54] BINOCULAR AND SPECTACLE-TYPE MOUNTING ASSEMBLY THEREFOR

[76] Inventor: William J. Beecher, 1960 Lincoln Park West, Chicago, Ill. 60614

[21] Appl. No.: 344,062

[22] Filed: Jan. 29, 1982

[51] Int. Cl.³ .............. G02B 23/18; G02B 7/02; G02C 3/00
[52] U.S. Cl. .................... 350/549; 350/545; 351/156
[58] Field of Search .............. 350/145–146, 350/242, 252, 310, 506, 540–544, 545–556, 574, 569; 351/118, 123, 155–157; 24/3 C, 3 J, 19, 68 R, 68 A, 252 R, 252 B, 263 SB

[56] References Cited

U.S. PATENT DOCUMENTS

| | | | |
|---|---|---|---|
| 558,889 | 4/1896 | Wittmann | 350/547 |
| 1,146,948 | 7/1915 | Patterson | 350/252 |
| 1,533,248 | 4/1925 | Harwix | 350/287 |
| 1,722,520 | 7/1929 | Glancy | 350/252 |
| 1,892,893 | 1/1933 | Karnes | 350/301 |
| 2,423,492 | 7/1947 | Fairbank | 350/252 |
| 2,470,316 | 5/1949 | Miller | 24/252 R |
| 2,625,854 | 1/1953 | Hayward | 350/550 |
| 2,659,270 | 11/1953 | Hurst | 351/118 |
| 2,819,527 | 1/1958 | Spurling | 350/566 |
| 3,466,728 | 9/1969 | Werner | 350/252 |
| 3,728,012 | 4/1973 | Downey | 351/157 |
| 3,829,201 | 8/1974 | Whiting | 350/252 |
| 3,985,421 | 10/1976 | Beecher | 350/552 |
| 4,056,303 | 11/1977 | Swarovski et al. | 350/551 |
| 4,272,153 | 6/1981 | Beecher | 350/551 |
| 4,294,541 | 10/1981 | Abler | 350/543 |

FOREIGN PATENT DOCUMENTS

| | | | |
|---|---|---|---|
| 863423 | 1/1953 | Fed. Rep. of Germany | 350/547 |
| 805328 | 11/1936 | France | 350/540 |

OTHER PUBLICATIONS

Consumers Reports, "Binoculars", 3-1980, pp. 196–203.
Berry, R., "Newtonian Telescopes", Telescope Making, Fall 1980, pp. 10–11.
Smith, W. J., "Modern Optical Engineering", McGraw Hill, 1966, pp. 427–431.
Hopkins, R. E., "Lens Mounting & Centering", Chapt. 2 of App. Optics & Optical Engineering, vol. VIII, 1980, Academic Press, pp. 31–41.
Richey, C. A., "Aerospace Mounts for Down-to-Earth Optics", Machine Design, 12-12-74, pp. 121–127.
Ingalls, A. G., "A Monthly Department for the Amateur Telescope Maker", Telescoptics, 11-1947, p. 237.

Primary Examiner—William H. Punter

[57] ABSTRACT

A binocular includes a pair of telescopes each having a hollow body shell, a plurality of mirrors in the shell and arranged to provide a folded light path therethrough, eyepiece and objective barrels mounted on the shell and having, respectively, eyepiece and objective lenses therein and disposed at opposite ends of the light path, such mirrors being ovally-shaped and sized substantially to conform to the respective cross sections thereat of the light bundle transmitted by the objective lenses, the shell defining an internal arcuate mirror rim-receiving surface for each of the mirrors, and a portion of the rim only of each mirror being adhesively secured to the receiving surface therefor by an elastic adhesive; and hinge structure including a hinge post connecting the telescopes together for adjustment of the interpupillary spacing of the eyepiece barrels, such hinge post having a tapped hole therein. A spectacle-type mounting assembly for such binocular includes a spectacle frame embodying a bow and a pair of earpieces extending from opposite ends of the bow, first mounting structure centrally secured to the bow, second mounting structure including a threaded shank adapted for threadedly engaging the binocular hinge post in the hole therein, and structure for securing the first and second mounting means together adjustably in selected vertical positions relative to each other, for up and down adjustment of the position of the binocular hinge post relative to the position of the frame as worn by the user, in conformity with the adjustment of the interpupillary spacing of the eyepiece barrels.

9 Claims, 13 Drawing Figures

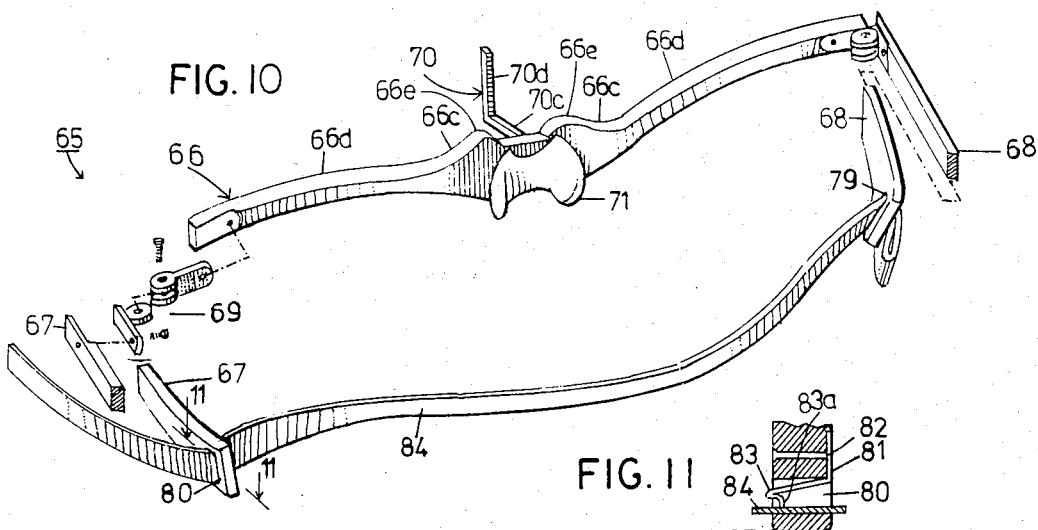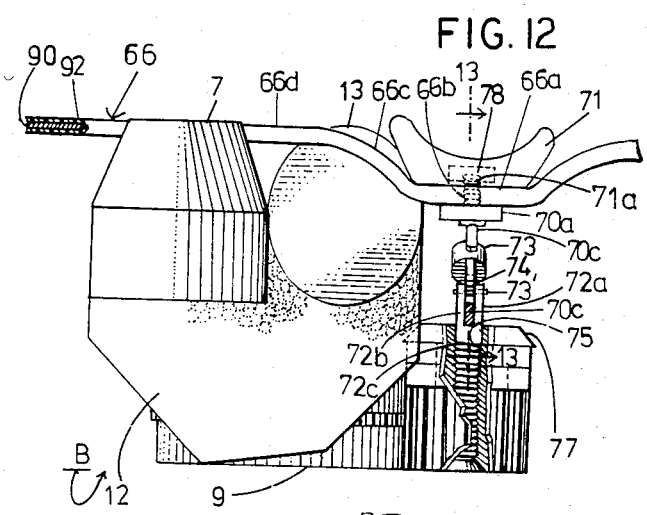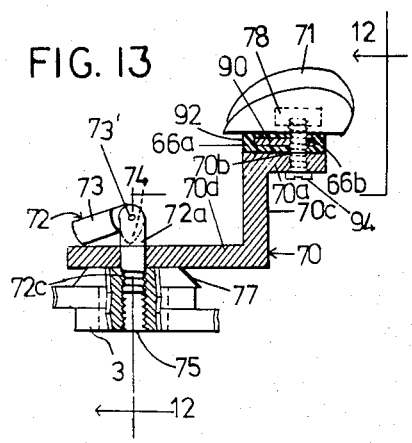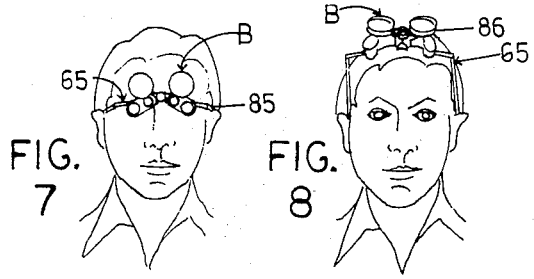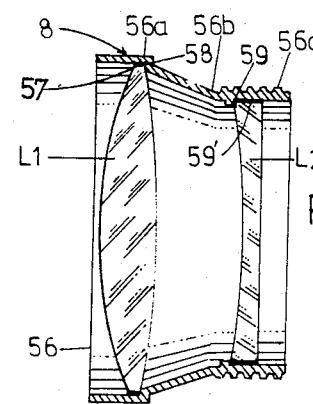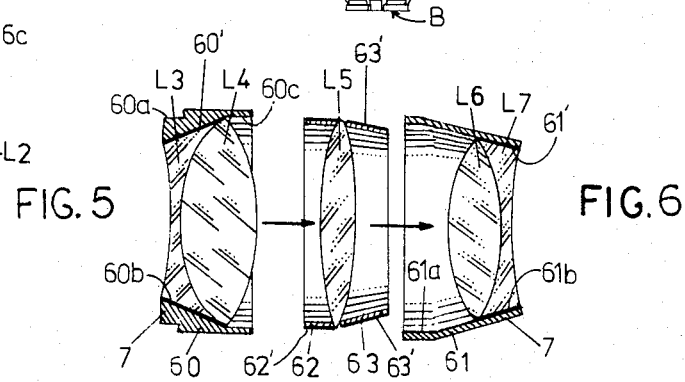

BINOCULAR AND SPECTACLE-TYPE MOUNTING ASSEMBLY THEREFOR

DESCRIPTION

1. Technical Field

The present invention relates in general to a binocular and a spectacle-type mounting assembly therefor. More particularly, the invention relates to a compact, lightweight binocular, which may be worn by the user similarly to conventional spectacles.

2. Background Art

The modern prism binocular or binocular-telescope had its beginning with the instrument presented by Professor Ernst Abbé to the manufacturer, Carl Zeiss, in 1849. The optical system consisted of an objective and eyepiece with two facing right-angle prisms arranged in porro 1 relationship to erect and correct the image. Most binoculars have been made this way ever since, except those made with roof prisms, and it is the prisms that are most responsible for the bulk and weight of modern binoculars.

The first change came with the binocular of John R. Miles (U.S. Pat. No. 3,424,283) in 1947, which binocular used silvered aluminum mirrors to erect the image. This 7×50 military binocular was heavy and bulky because of the large lenses. Small binoculars have been known, for instance, that of Baumann (U.S. Pat. No. 1,397,156) in 1921, but his invention used very small optics. The Baumann binocular was not a high performance binocular, since it had an objective lens less than 30 mm in diameter. Optical properties were sacrificed to enable it to be made smaller in size. Also, the binocular employed porro prisms, making it relatively heavy.

A compact, high performance binocular was patented by me (U.S. Pat. No. 3,985,421) in 1976, but it employs horseshoe-shaped mirrors 3 mm in thickness, fitted by hand into aperture-forming frames integrally formed in a hollow body shell. The shaped of the mirrors is dictated by the need for mounting them on the frames. Eight mirrors are employed, and the setting and collimation of eight mirrors arranged in porro 1 fashion poses production problems in the placing of the mirrors individually in the frames, since the mirrors must be oriented by trial and error, with shimming.

While the varying-sized mirrors of the foregoing binocular are designed to fit to a certain extent the conically-shaped folded light paths which extend between the objective lenses and the eypieces, in order to reduce the amount of wasted space and materials in the construction of the binocular, space is lost to the portions of the mirrors used for mounting purposes, and to the mounting frames. Moreover, the shell or housing for the telescopes of the binocular is difficult and expensive to manufacture, especially in view of the provision of a thin bridge of material extending between the mirror frames. Also, the bridge of material protrudes from the body of the shell, undesirably increasing the overall length of the binocular.

DISCLOSURE OF THE INVENTION

A principal object of the present invention is to provide a new and improved binocular, which is readily and conveniently constructed in accordance with modern assembly techniques, and which is exceptionally light in weight, short, compact, and efficient in operation, while still constituting a high performance binocular.

An accompanying object is to provide such a binocular which is constructed with small, plate-like mirrors of oval shape and varying size, to minimize space and weight requirements, while providing a high degree of accuracy.

An additional object is to provide such a binocular in which the mirrors and certain of the lenses are resiliently mounted, to minimize space requirements, and impart shock resistance to the assembly while increasing durability, and also enabling very thin mirrors to be employed.

A specific object is to provide a 7×30 binocular so light in weight and compact that it may be worn as a spectacle.

Another object is to provide a spectacle-type mounting assembly for such a binocular, which enables the binocular to be worn on the head of the user in a highly convenient manner, regardless of the interpupillary adjustment of the eyepieces of the binocular.

A further object is to provide a binocular and a mounting assembly therefor which accomplish the foregoing objects, and wherein the binocular includes a pair of side-by-side telescopes which are hingedly connected together for enabling the interpupillary spacing to be adjusted. An accompanying object is to be able to adjust the interpupillary spacing of the binocular, and then attach it rapidly to a mounting assembly for wearing without need for further adjustment.

In a preferred embodiment of the invention, an improvement is provided in a binocular which includes a pair of telescopes each having a hollow body shell, a plurality of mirrors in the shell and arranged to provide a folded light path therethrough, and eyepiece and objective lenses mounted on the shell at opposite ends of the light path, such improvement embodying the provision of mirrors which are ovally shaped and are sized substantially to conform to the respective cross sections at the mirrors of the light bundle transmitted by the objective lenses. In a further preferred embodiment, also useful in the mounting of other types of mirrors, the body shell defines an internal mirror edge receiving surface for each of the mirrors, and a portion of the edge of each mirror is adhesively secured to such surface by an elastic adhesive.

In another preferred embodiment of the invention, wherein the telescopes are hingedly connected together by a hinge post, for adjustment of the interpupillary spacing of the eyepiece barrels, a spectacle-type mounting assembly for the binocular is provided. The assembly embodies a spectacle frame including a bow and a pair of earpieces extending from opposite ends of the bow, first mounting means centrally secured to the bow, second mounting means secured to the hinge post, and means for securing the first and the second mounting means together adjustably in selected vertical positions relative to each other, for up and down adjustment of the position of the binocular hinge post relative to the position of the frame as worn by the user, in conformity with the adjustment of the interpupillary spacing of the eyepiece barrels. In a further preferred embodiment, the bow is arranged for engagement with upper surfaces of the eyepiece barrels when the relative position of the telescopes on the hinge post results in the positioning of the eyepiece barrels, as adjusted for proper interpupillary spacing, suitably for viewing through the barrels.

BRIEF DESCRIPTION OF THE DRAWINGS

The above-mentioned and other objects and features of this invention and the manner of attaining them will become apparent, and the invention itself will be best understood by reference to the following description of preferred embodiments of the invention taken in conjunction with the accompanying drawings, wherein:

FIG. 5 is an enlarged axial cross-sectional view of one of the objective lens barrels of the binocular of FIG. 1;

FIG. 6 is an enlarged exploded axial cross-sectional view of one of the eyepiece lens barrels of the binocular of FIG. 1;

FIGS. 7, 8 and 9 are pictorial views showing the binocular of FIG. 1, on a reduced scale, mounted on a spectacle-type mounting assembly which is constructed in accordance with the present invention, in three positions in which the binocular may be worn by the user;

FIG. 10 is an enlarged broken rear pictorial view of the mounting assembly illustrated in FIGS. 7-9;

FIG. 11 is an enlarged cross-sectional fragmentary detail view of a slotted end portion of a left earpiece in the assembly of FIG. 10, taken substantially on the line 11—11 of FIG. 10;

FIG. 12 is an enlarged fragmentary left side bottom view of the binocular of FIG. 1, mounted in place on the assembly of FIG. 10 and taken substantially on lines 12—12 of FIG. 13; and FIG. 13 is an enlarged cross-sectional view of the mounting assembly taken substantially on the line 13—13 of FIG. 12, illustrating the manner of attaching the binocular thereto.

BEST MODE FOR CARRYING OUT THE INVENTION

Figure 1:
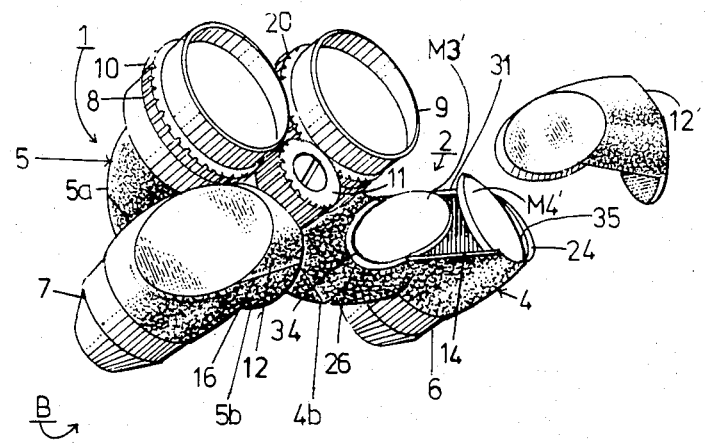
FIG. 1 is a front pictorial, partly exploded view of a binocular in accordance with the present invention, which view is taken from the right side and slightly below the binocular, a front mirror cover being removed for illustration purposes to expose a pair of front mirrors positioned in a body shell opening.

Referring to FIGS. 1-4 of the drawings, a binocular B is constructed in accordance with the present invention. The binocular B generally comprises a pair of complementary right-hand and left-hand (as viewed from the rear) telescopes 1 and 2, which are connected together by a central hinge 3 for swinging movement thereabout toward and away from each other for interpupillary adjustment.

The telescopes 1 and 2 are mirror images of each other. They include respective left and right hollow body shells 4 and 5, which have respective upper generally frusto-conical tubular shell portions 4a and 5a, and respective lower generally frusto-conical tubular shell portions 4b and 5b. Each of the shells 4 and 5 is molded integrally in one piece of thermoplastic material, such as polystyrene, methyl methacrylate, or other suitable material, in the preferred embodiments of the invention. Polystyrene is preferred for its high impact strength and dimensional stability.

The body shells 4 and 5 are similar to the shells described in my U.S. Pat. No. 4,272,153, with structural changes described hereinafter. In particular, the axes of the upper shell portions 4a and 5a are positioned or extend substantially at right angles to the axes of the lower shell portions 4b and 5b, respectively, in order to subtend a right angle space between the axes of the portions of each shell. The shell portions are arranged with the small bases of the upper shell portions 4a and 5a intersecting the small bases of the lower shell portions 4b and 5b, respectively. In the illustrative preferred embodiment of the invention, the foregoing axes of the shell portions 4a, 4b, 5a, and 5b and the hinge 3 connecting the shells 4 and 5 together have the general configuration of the letter "n X," as viewed from the rear, or facing the eyepiece lenses, described hereinafter.

Identical rearwardly-disposed left and right eyepiece lens-containing eyepiece barrels 6 and 7 are mounted on the large bases of the lower shell portions 4b and 5b, respectively. Identical forwardly disposed right and left objective lens-containing objective barrels 8 and 9 are mounted on the large bases of the upper shell portions 5a and 4a, respectively.

As described in detail in U.S. Pat. No. 3,918,792 for a like mechanism, a focusing mechanism on each objective barrel 8 and 9 includes a slip gear 10 or 20, which meshes with a common centrally-disposed idler gear 11 mounted on the front end of the hinge 3. The mechanism enables the user to hold one of the objective barrels with the thumb and forefinger and turn the other to focus it, or to turn either one of the objective barrels to focus both barrels at the same time.

Each of the telescopes 1 and 2 includes an identical optical system, and the system 22 for the right-hand telescope 1 is shown schematically in FIG. 3 and will be described as representative of both systems. Light rays from the image being viewed enter a first or outer objective lens L1, and then pass through a second or inner objective lens L2, which lenses are optically centered in the objective barrel 8. Light rays transmitted by the objective lens L1 and L2 successively impinge upon and are reflected by mirrors M1, M2, M3, and M4, all at 45-degree angles of incidence and reflection, and then enter a wide angle eyepiece made up of five eyepiece lenses L3, L4, L5, L6, and L7. The mirrors M1 and M2 constitute a front pair of mirrors, which are mounted in the upper shell portion 5a. The mirrors M3 and M4 constitute a rear pair of mirrors, which are mounted in the lower shell portion 5b. The eyepiece lenses L3-L7 are optically centered in the eyepiece barrel 7.

The mirrors in the front and rear pairs of mirrors (M1 and M2, and M3 and M4, respectively) are disposed at an angle of 90° to each other, exactly duplicating the light path through a pair of right angle prisms arranged in porro 1 relationship. The system 22 provides a folded light path between the objective lenses L1 and L2, and the eyepiece lenses L3–L7, in the body shell 5 of the right-hand telescope 1. A like light path, not illustrated, is provided in the body shell 4 of the left-hand telescope 2. The prime symbols M1'–M4' are employed in the drawings to designate the mirrors in the shell 4 of the left-hand telescope 2 which are counterpart to the respective mirrors M1–M4 in the shell 5 of the right-hand telescope 1.

Figure 3:
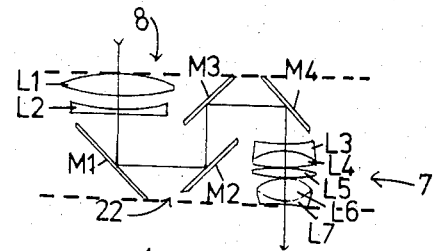
FIG. 3 is a schematic diagram of the optical system of one of the telescopes of the binocular of FIG. 1, illustrating the relative sizes and relationships of the lenses and mirrors.

Referring to FIGS. 3, 5, and 6, the objective lenses L1 and L2 are air-spaced in the objective barrel 8. The first objective lens L1 is a double convex lens. The second objective lens L2 is a plano-concave lens. The eyepiece lenses L3–L7 are mounted in the eyepiece barrel 7 in contacting relationship. A double concave first or innermost eyepiece lens L3 forms a cemented achromat with a double convex second eyepiece lens L4. A double convex third eyepiece lens L5 follows the second lens L4. A double convex fourth eyepiece lens L6 follows the third lens L5, and it forms a cemented achromat with a double concave fifth or outermost eyepiece lens L7. All of the lenses are as thin as possible. The lens system essentially is the same as the system disclosed in my U.S. Pat. Nos. 3,918,792 and 3,985,421.

The peripheral light rays which pass through the objective lenses L1 and L2 converge conically to principal focuses beyond the mirror M4 and at principal focuses of the eyepiece lenses L3–L7, for viewing through the latter. Light rays passing centrally through the objective lenses L1 and L2 diverge conically to the eyepiece lenses L3–L7. The convergent and divergent cones together constitute what is referred to herein as the bundle of light rays passing through each of the telescopes 1 and 2. The bounds of such bundle of light rays are illustrated in my above-identified earlier patents, i.e., in FIG. 19 of U.S. Pat. No. 3,918,792 and in FIG. 19 of U.S. Pat. No. 3,985,421.

In the illustrative preferred embodiment, the focal length of the combined objective lenses L1 and L2 is 96.0 mm, which is as short as possible for accommodating mirrors of the sizes necessary for transmitting a full light bundle. The eyepiece lenses L3–L7 have a high refractive index, to provide a focal length for the combined lenses of approximately 13.15 mm, and an angle of 9°. The power for the binocular B (the quotient of the focal length of the objective lenses over that of the eyepiece lenses) thus is 7.30×.

In accordance with the present invention, each of the mirrors M1–M4 is substantially oval, the mirrors M1, M2 and M3 are progressively smaller in size, and the mirror M4 is slightly enlarged, so that the mirrors conform substantially exactly to the respective cross sections of the bundle of light rays where it impinges thereon. In other words, the sizes and shapes of the faces of the mirrors M1–M4 are substantially the same as the sizes and shapes of the cross-sectional areas of the bundle of light rays at the respective transverse angular positions of the mirrors. The mirrors M1–M4 and M1'–M4' preferably are made of glass in plate-like configuration, or in the form of laminae, about 1 mm in thickness, having a flatness in the range of two fringes and an enhanced silver reflective coating with a reflectivity in excess of 98%. It is further preferred that the mirrors have edges such as illustrated at E1', E2', E3', and E4' in FIG. 4, which are bevelled at an angle of about 45° for mounting purposes.

Figure 2:
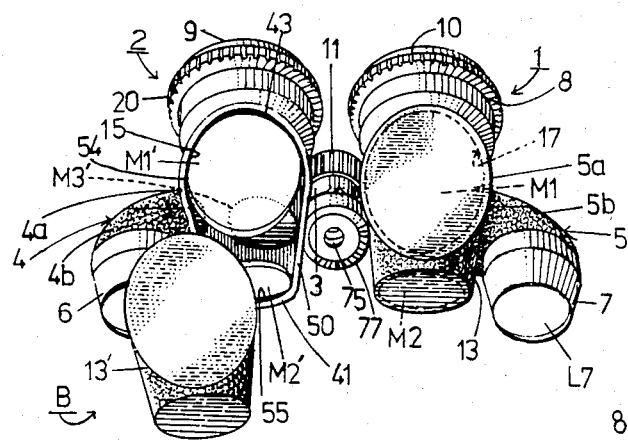
FIG. 2 is a rear, partly exploded pictorial view thereof, taken slightly from above with a rear mirror cover removed.

Referring to FIGS. 1–3, when the binocular B is in use, the axis of the objective lenses L1 and L2, and the axis of the eyepiece lenses L3–L7 are horizontal, with the former axis disposed in spaced parallel relation above and inwardly of the latter axis. The first and second mirrors M1 and M2 in the rear pair lie in inclined planes at an angle of 90 degrees to each other, with the first mirror M1 above the second mirror M2 and centered on the axis of the objective lenses L1 and L2. The light rays follow a horizontal path rearwardly from the objective lenses L1 and L2 to the first mirror M1, and a vertical or inclined path downwardly to the second mirror M2, depending upon the angular dispositions of the telescopes 1 and 2 about the hinge 3.

The third and fourth mirrors M3 and M4 in the front pair lie in vertical or inclined planes at an angle of 90 degrees to each other, with the fourth mirror M4 centered on the axis of the eyepiece lenses L3–L7. The light rays follow a horizontal path forwardly from the second mirror M2 to the third mirror M3, a horizontal or inclined path sideways from the third mirror M3 to the fourth mirror M4, and a horizontal path rearwardly from the fourth mirror M4 to the eyepiece lenses L3–L7.

The mirrors M1–M4 are disposed as closely as possible to each other and to the adjacent lenses L2 and L3, while still reflecting completely the bundle of light rays transmitted by the objective lenses L1 and L2, to minimize binocular size and weight. Size and weight also are minimized by constructing the shell 5, and likewise the other shell 4, to conform similarly to the cross sections of the bundle of light rays and of the mirrors M1–M4. The above-described frusto-conical configuration of the upper shell portion 5a results from the decreasing cross section of the mirrors M1 and M2, with the shell portion decreasing in diameter in a direction away from the objective barrel 8. Similarly, the above-described frusto-conical shape of the lower shell portion 5b results from the increasing size of the mirrors M3 and M4, with the shell portion decreasing in diameter in a direction away from the eyepiece barrel 7. The shells 4 and 5 thus conform closely in size and shape to the folded light path between the objective lenses L1 and L2 and the eyepiece lenses L3–L7.

Referring to FIG. 1, the binocular B includes a pair of like cup-shaped small front mirror covers 12' and 12 fixed in place over respective left and right elongated front mirror-mounting openings 14 and 16 in the respective lower shell portions 4b and 5b of the body shells 4 and 5. The left front cover 12' extends over the left front opening 14 and is spaced apart from the left front pair of mirrors M3' and M4', mounted within the opening. Similarly, the right front cover 12 extends over the right front opening 16 and is spaced apart from the right front pair of mirrors M3 and M4, mounted within the opening.

The front openings 14 and 16 are shaped alike and the mirror mountings are the same, and therefore, only the left front opening 14 and its surrounding structure will be described, together with the mounting of the mirrors M3' and M4' therewithin. The left front opening 14 is bounded by a pair of oppositely-disposed arcuate outer and inner end wall portions 24 and 26 respectively. Each end wall portion defines an internal arcuate surface which is adapted to receive a portion only of the bevelled rim or edge E4' or E3' of a mirror M4' or M3', in conformity therewith. Side wall portions 31 bound the front opening 14 and extend between the end wall portions 24 and 26.

In assembling the binocular B, the mirrors M3' and M4' are bonded to the body shell 4 within the respective arcuate end wall portions 24 and 26 by means of thin elastic or resilient adhesive ribbons 35 and 34, respectively, as shown in heavy lines in FIG. 1. About one-half of the peripheral rims or edges of the oval-shaped mirrors M3' and M4' are coated with a fast-curing elastic adhesive material or substance. The coated mirrors then are moved into the body shell 4, until they are accurately positioned in engagement within the complementary-shaped internal arcuate surfaces of the end wall portions 24 and 26, as shown in FIG. 1. The planes of the internal arcuate surfaces of the end wall portions 24 and 26 are inclined toward one another, so as to position the mirrors M3' and M4' in the aforementioned proper spatial relationship. The mirrors are held or suspended in the desired positions until the adhesive material cures, to form the adhesive ribbons 34 and 35, which bond the described portion of each mirror rim to the internal surface of the adjacent wall portion.

In this manner, the coated spaced apart mirrors M3' and M4' are resiliently bonded to the mating surfaces of the respective end wall portions 26 and 24 forming parts of the body shell 4, by an elastic layer. The mirrors are held in their proper positions in a strain-free manner, to insure that they remain flat as they adhere to the adjacent surfaces of the body shell 4, and they are cushioned against shock. The bonded mirror rim portions are recessed slightly (about 1 mm) from the outer edges of the arcuate end wall portions 24 and 26, and the inner portions of the mirrors project forwardly out of the opening 14.

The mirror cover 12' next is positioned over the opening 14 and the mirrors M3' and M4', in forwardly spaced apart relationship to the mirrors. The cover 12' is fixed to the body shell 4, in a suitable manner. The mirror covers in the preferred embodiments of the invention, like the shells 4 and 5, are molded of thermoplastic material, such as polystyrene, methyl methacrylate or other suitable materials, so that a plastic solvent, such as toluene in the case of polystyrene, may be used to weld or fuse the mirror covers to the body shells in fluid-tight and moisture-proof manner.

Referring to FIG. 2, a pair of like cup-shaped large rear mirror covers 13' and 13 are fixed in place over respective left and right elongated rear mirror mounting openings 15 and 17 in the respective upper shell portions 4a and 5a of the shells 4 and 5. The large left rear cover 13' extends over the left rear opening 15 and is spaced apart from the left rear pair of mirrors M1' and M2', mounted within the opening. Similarly, the large right rear cover 13 extends over the right rear opening 17 and is spaced apart from the right rear pair of mirrors M1 and M2, mounted within the opening.

The left rear opening 15 and associated structure will be described, as representative of the two like openings 15 and 17 and their associated structure. The left rear opening 15 is similar in shape to but larger than the left front opening 14, and is bounded by a pair of lower and upper oppositely-disposed arcuate inner and outer end wall portions 41 and 43, respectively, and by side wall portions 50 which extend between the end wall portions 41 and 43. Each of the end wall portions 41 and 43 defines an internal arcuate surface which is adapted to receive a portion only of the bevelled rim or edge E2' or E1' of a mirror M2' or M1', in conformity therewith.

Figure 4:
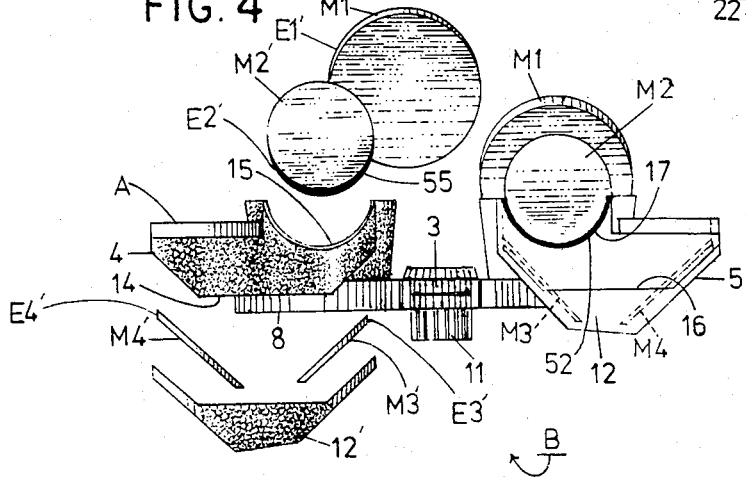
FIG. 4 is an exploded pictorial partial bottom view of the binocular of FIG. 1, illustrating it with various parts removed and with two of the rear mirrors in the process of being inserted into a receiving opening therefor and with the left front pair of mirrors and their cover removed.

About one-half of the peripheral rim or edge of each of the mirrors M1' and M2' is bounded to the internal arcuate surface of the adjacent wall portion 43 or 41 by an elastic adhesive ribbon 54 or 55, in like manner to the mounting of the front mirrors M3' and M4', as described above. FIG. 4 illustrates one mirror M2' in the process of being inserted into position within the left rear opening 15, and a counterpart mirror M2 fixed in place in the right rear opening 17 by an adhesive ribbon 52. The left rear mirror cover 13', constructed of thermoplastic material as described above, is fixed in place over the opening 15 by solvent-welding or other fusion method. FIG. 2 illustrates the left rear mirror cover 13' loose prior to its affixation, and the right rear mirror cover 13 in place following the affixation.

Referring to FIG. 5 of the drawings, the objective barrel 8 is representative of both barrels 8 and 9, and includes a rearwardly narrowing one-piece integral tubular member 56 having a cylindrical front end portion 56a, a frusto-conical central portion 56b and a threaded cylindrical rear end portion 56c. The first objective lens L1 is seated in the front end portion 56a on a forwardly facing first internal annular shoulder 58 formed by the front end of the central portion 56b. The first lens L1 is secured to the shoulder 58 and to the adjacent tube wall by a first annular elastic adhesive ribbon 57 around the lens periphery. The second objective lens L2 is seated in rearwardly spaced apart relation to the first lens, in the rear end portion 56c on a rearwardly facing second internal annular shoulder 59 formed on the wall of the rear end portion adjacent to the rear end of the central portion 56b. The second lens L2 is secured to the second shoulder 59 and to the adjacent tube wall by a second annular elastic adhesive ribbon 59'. The elastic adhesive ribbons 57 and 59' are composed of adhesive material like the material employed for mounting the mirrors M1-M4 and M1'-M4'. The bonding ribbons provide liquid-tight and moisture-proof seals, and they cushion the lenses against shock.

Referring to FIG. 6, the eyepiece barrel 7 is representative of both barrels 6 and 7, and includes a tubular base member 60 having a recessed annular mounting portion 60a around its front end, a frusto-conical internal front wall surface 60b, and a cylindrical internal rear wall surface 60c. A cylindrical tubular first spacer 62 fits telescopically within the rear end of the base member 60, adjacent to the cylindrical inner surface 60c thereat. The eyepiece barrel 7 also includes a tubular rear member 61 having a cylindrical internal front wall surface 61a, and a frusto-conical internal rear wall surface 61b. A frusto-conical second tubular spacer 63 fits telescopically within the rear member 61, adjacent to the frusto-conical internal surface 61b thereof. The first spacer 62 also fits telescopically within the rear member 61, adjacent to the cylindrical internal surface 61a thereof.

The achromat composed of the lenses L6 and L7 fits wedgingly into the rear member 61, adjacent to the frusto-conical surface 61b thereof, where it is secured in place by an annular elastic adhesive ribbon 61'. The second spacer 63 is received within the rear member 61 adjacent to the frusto-conical surface 61b thereof, where it is secured by an annular elastic adhesive ribbon or band 63' on the spacer, and it serves to hold the lenses L6 and L7 in place.

The lens L5 is received in the rear member 61, adjacent to the second spacer 63. The first spacer 62 is received in the rear member 61, adjacent to the cylindrical inner surface 61a thereof, where it is secured by an annular adhesive ribbon or band 62' therearound. The first and second spacers 62 and 63 abut on opposite sides of the marginal edges of the lens L5, to secure it in place.

The achromat composed of the lenses L3 and L4 fits wedgingly into the base member 60, adjacent to the frusto-conical surface 60b thereof, where it is secured in place by an annular elastic adhesive ribbon or band 60'. The first spacer 62 also is received within the base member 60, where it is secured adjacent to the cylindrical inner surface 60c thereof by the annular elastic adhesive ribbon or band 62' on the spacer, and it serves to hold the lenses L3 and L4 in place.

The inner ends of the base member 60 and the rear member 61 abut upon each other when the barrel 7 is assembled, and they are integrally secured together at a liquid-tight and moisture-proof joint. Thus, in the preferred embodiments of the invention, the members 60 and 61 are formed of a thermoplastic material, and the members 60 and 61 may be solvent-welded or fused together where they abut. As thus assembled, the lenses L3–L7 are mounted in contacting relationship, similarly to the illustration in FIG. 18 of the aforesaid U.S. Pat. No. 3,985,421. The barrel 7 is completely liquid-tight and moisture-proof, with the elastic adhesive ribbons 60', 61', 62' and 63' providing seals which prevent the entry of liquid or moisture, and also serving to cushion the lenses against shock.

The objective and eyepiece barrels of the binocular B enclose the lenses with tubular members which are as thin as possible while affording adequate strength. The objective barrels 8 and 9 are adjustably mounted in threaded openings in the front ends of the respective upper shell portions 5a and 4a, in the manner disclosed in the aforesaid U.S. Pat. No. 3,985,421. The threaded portion 56c thereof is coated with optical grease, in order to prevent the entry of liquid or moisture. The front ends of the eyepiece barrels 6 and 7 are inserted into the rear ends of the lower shell portions 4b and 5b, with the shell portions telescopically receiving the recessed portions 60a of the barrels therein. The shell portions and the barrels may be welded or fused together, by solvent welding or other fusion methods, when the parts are constructed in the preferred manner of plastic, thereby to form liquid-tight and moisture-proof joints. With each of the shells 4 and 5 molded integrally in one piece of plastic, as in the preferred embodiments, the binocular B is completely liquid-tight and moisture-proof, rendering it especially valuable for use in the field.

The adhesive material used for securing the mirrors and lenses in place is a material producing an elastic or resilient bond, such as an elastomer, preferably a synthetic or natural rubber base material. The material preferably is quick setting. It adheres to the plastic body shell and to the glass lenses and mirrors tenaciously and is water and moisture-proof.

A preferred adhesive material is a neoprene base "contact cement," such as "Weldwood Contact Cement" (Roberts Consolidated Industries, City of Industry, California), containing the organic solvents methyl ethyl ketone, acetone, toluene, and petroleum distillates. Toluene is employed as a thinner and as a reactivator of the adhesive when dry. The adhesive material preferably is applied to the edges of the mirrors and lenses, and also may be applied to the shells and barrels, and allowed to dry. Toluene is dispensed carefully from a micropipette at the point of contact to reactivate the material for adhesion. The adhesive material sets in about 5–10 minutes, depending upon the amount of solvent used.

Alternative adhesive materials include "Duro Plastic Rubber" (Woodhill Permatex), "Plio-Bond" nitrile-phenolic adhesive (Goodyear), latex (aqueous) adhesives, and silicone rubber adhesives.

By securing the mirrors M1–M4 and M1'–M4' adhesively at their edges, the binocular B utilizes the full reflective surfaces of the mirrors. There is no need for retaining rings or recesses, which would cover the margins of the mirror faces. Similarly, the lenses L1–L7 are utilized substantially to a maximum extent, owing to the adhesive mounting thereof. By eliminating the need for retaining bridges between mirror frames, as in the structure of U.S. Pat. No. 3,985,421, it is easier to design and construct a mold for a body shell, and the overall length of the binocular is reduced. The mirrors may be positioned through the body shell openings, rapidly, conveniently and accurately, without need for trial and error procedures or for shims. Mechanical mounting of the mirrors may be accomplished with greater efficiency.

As compared to the structure of prior U.S. Pat. No. 3,985,421, the overall length may be reduced by one-half inch, to about one and one-half inches for a 7×30 wide angle binocular. The binocular of the invention is especially desirable for use as a spectacle binocular, where the shortness and compactness are very desirable. The new binocular also is lighter than the binocular of the patent, weighing less than three ounces in the preferred illustrative embodiment having the parts constructed of polystyrene. It is contemplated that, alternatively, the body shells 4 and 5 may be constructed of molded light weight metal, preferably die cast magnesium alloy. The lenses are compactly enclosed by the eyepiece barrels, thus eliminating the dark framing circle ordinarily seen when looking through conventional binoculars.

The invention provides a spectacle-type mounting assembly which is constructed for cooperation with the binocular B. The binocular is readily and rapidly mounted on the assembly in a cooperative manner, to furnish a lightweight compact combination, which approaches a pair of spectacles in ease and convenience of use. An outstanding feature of the invention is that the binocular is rapidly and accurately mounted on the assembly, with the binocular correctly adjusted for viewing.

Referring to FIGS. 7–10, a preferred embodiment of the spectacle-type mounting assembly for a binocular provided in accordance with the invention includes a spectacle frame 65 for supporting the binocular B over the eyes of the user. The frame 65 is adapted to be worn on the head above the eyes of the user and fits the contour of the face, as shown in FIG. 7, for wearing the binocular as spectacles. An elastic hand 85 secures the frame 65 to the head for viewing through the binocular B, in position 85 shown in FIG. 7, or for wearing the frame 65 and the binocular B on top of the head, in the position generally indicated at 86 in FIG. 8. In another alternative, shown in FIG. 9 at 87, the frame 65 and the binocular B can hang from the neck of the user.

The frame 65 includes an elongated bow or cross member 66, and a pair of hingedly-connected left and right elongated earpieces or temples 67 and 68 extending rearwardly therefrom. A pair of conventional hinges, such as the disassembled hinge indicated at 69, connect the earpieces to the bow 66.

Referring also to FIGS. 12 and 13, the bow 66 is constructed of a metal bar 90 encased in a plastic sleeve 92 bonded thereto. The bow is formed or bent longitudinally to provide an integral one-piece structure of a central mounting portion 66a having a central bolt opening 66b therein, a pair of forwardly projecting arcuate bridging portions 66c, each having a curved upper promontory or boss 66e thereon, and a pair of relatively straight locating portions 66d.

A mounting bracket 70 serves for mounting the binocular B on the frame 65, particularly, on the bow 66 thereof. The bracket 70 is an integral one-piece structure of a connecting flange 70a having a bolt opening 70b therein, a spacer leg 70c perpendicular to the flange 70a, and a supporting leg 70d perpendicular to the spacer leg 70c. The supporting leg 70d extends from the spacer leg 70c in a direction opposite to the extension of the flange 70a from the spacer leg, and in parallel relation to the flange.

A nosepiece 71 is mounted on the inside of the mounting portion 66a of the bow 66. The nosepiece 71 preferably is constructed of plastic, and a threaded nut 78 is embedded therein. The nut is accessible to a threaded bolt 94 through a bolt opening 71a in the nosepiece 71.

The mounting bracket 70 and the nosepiece 71 are mounted on the respective inner and outer sides of the bow 66, by inserting the bolt 94 successively through the opening 70b in the flange 70a, the opening 66b in the mounting portion 66a, and the opening 71a in the nosepiece 71, and into threaded engagement with the nut 78. The spacer leg 70c then extends forwardly from the bow 66, and the supporting leg 70d extends upwardly therefrom, the two legs together thus having an L-shaped configuration, upstanding as worn.

A clamp fastener 72 of the quick-release type serves for adjustably mounting the binocular B on the supporting leg 70d. The fastener 72 includes a yoke or bifurcated member 72a having bifurcations 72b and a threaded shank 72c. The fastener 72 also includes a locking lever 73 which terminates at one end in a laterally extending pointed tooth 74. The lever 73 is pivotally mounted on the yoke 72a intermediate the ends of the lever and proximate to the tooth 74 by a pivot pin 73', which pin extends through the bifurcations 72b and the lever 73 disposed therebetween.

The threaded shank 72c of the yoke 72a is inserted into a threaded opening 75 which extends through the hinge post 77 on the binocular B, as described in detail for a like hinge structure in U.S. Pat. No. 3,985,421. In mounting the binocular B, the supporting leg 70d is inserted between the bifurcations 72b of the yoke 72a, while the lever 73 is aligned axially with the yoke. When the desired relative positions of the bow 66 and the binocular B are attained, the lever 73 is depressed into the clamping position illustrated in FIG. 13. At this time, the apex of the pointed lever end 74 firmly engages the supporting leg 70d. The lever 73 snaps into place, to an over-center position, whereby the bow 66 and the binocular B are instantly and securely locked together.

The mounting bracket 70 and the cooperating fastener 72 serve to locate the binocular hinge post 77 vertically relative to the bow 66. The extent to which the hinge post 77 is elevated above the bow 66 depends upon the degree of angular adjustment of the binocular B for proper interpupillary spacing (such adjustment being known, e.g., as described in U.S. Pat. No. 3,985,421). Thus, when the binocular user has set the desired correct interpupillary distance by rotating or pivoting the two telescopes 1 and 2 relative to each other about the hinge 3, the supporting leg 70d of the bracket 70 is inserted into the opening between the bifurcations 72b in the yoke 72a. The fastener 72, being connected to the hinge post 77 of the binocular B, is slipped downwardly on the supporting leg 70d and the binocular is manipulated, until the bottom of the bow 66 engages the upper surfaces of the rims of the eyepiece barrels 6 and 7, and the promontories 66e engage the rear mirror covers 13' and 13 of the upper shell portions 4a and 4b, respectively. The degree of insertion of the supporting leg 70d into the yoke 72a thus is limited by contact of the bow 66 with the eyepiece barrels 6 and 7 set for the correct interpupillary spacing. In this manner, the bow performs a locating or positioning function. In the preferred illustrative embodiment, the promontories 66e of the precisely-shaped bow snug against curved inner surfaces of the rear mirror covers 13 and 13', to provide firm support for the binocular and prevent rotation of the telescopes 1 and 2. When the parts are thus disposed, the binocular hinge post 77 is clamped to the mounting bracket 70, by operation of the lever 73 in the manner described above, whereupon the lenses of the eyepiece barrels 6 and 7 will be located and locked precisely in front of the eyes of the wearer, for viewing purposes, upon placing the frame 65 on the head.

The earpieces 67 and 68 are provided with transverse slots 80 and 79, respectively, adjacent to and spaced inwardly from their distal ends. One end of the elastic band 84 is passed through the slot 79 in one earpiece 68 and secured thereto by looping the end of the band, as shown in FIG. 10. The remaining end of the band is passed through the slot 80 in the other earpiece 67 and adjustably secured therein. Referring to FIG. 11, a bent leaf spring clip 81 is fixed to one side of the earpiece 67 by a rivet 82. A bent portion 83 of the clip 81 extends through the slot 80 and projects slightly from the opposite side of the earpiece 67, where it may be engaged by a fingernail of the user. A return bend 83a on the bent portion 83 is bent to snub the band 84 against the earpiece, within the slot 80, thereby to releasably secure the band in place. The clip engagement is readily released by pushing the bent portion 83 forward, whereby the length of the portion of the band which extends between the earpieces 67 and 68 may be changed or adjusted at will. Thus, for example, the band 84 may be let out for carrying the frame 65 and the binocular B around the neck, as shown in FIG. 9.

When the binocular B is worn on the mounting assembly, the wearer may view his surroundings beneath the binocular, particularly, beneath the eyepiece barrels 6 and 7, in walking or driving, with less obscuring of the vision than when wearing a visor. The gaze may be shifted rapidly and instantaneously for locking on the desired object and viewing through the eyepiece lenses, by lowering the head a few degrees. The eye instinctively centers the desired object on the fovea. The wearer sees a circle of magnification, surrounded by the circle of his normal vision, without dark framing rings. In this manner, the wearer may switch back and forth between normal and magnified vision, instantaneously, in the same manner as the wearer of bifocal spectacles. Employing the above-described "X" configuration of the binocular, the objective barrels 8 and 9 are disposed toward the center of the forehead, within the blind spot of the viewer's nose area, and the eyepiece barrels 6 and 7 are disposed to the outside, with no binocular mass immediately above them. The ability to use the binocular in this manner and with such results is especially advantageous for viewing objects in the field, which frequently requires rapid changes in viewing.

While the improvements provided by the invention in the binocular and the mounting assembly are especially advantageous and preferably employed with the illustrative binocular structure, it will be apparent to those skilled in the art that, alternatively, they may be employed with other binocular structures to similar advantage. Thus, for example, the improvements in the optical system and its mounting are similarly advantageous when employed with a binocular having the general arrangement of the telescopes disclosed in U.S. Pat. No. 3,985,421. It will be apparent also that, while the illustrative structure is preferred, changes and modifications may be made in the binocular mounting means secured to the bow, the cooperating mounting means secured to the hinge post, and the means for securing the two mounting means together, while functioning substantially in the same manner and with the same results. Likewise, other changes and modifications in the structures which have been described and illustrated may be made within the spirit and scope of the invention, as will be apparent to those skilled in the art. It is intended that all such changes and modifications be included within the scope of the appended claims.

I claim:

1. In a binocular including a pair of telescopes each having a hollow body shell, a plurality of mirrors in said shell arranged to provide a folded light path therethrough, and eyepiece and objective lenses mounted on said shell at opposite ends of said light path, the improvement wherein said mirrors are ovally-shaped and are sized to conform to the respective cross sections thereat of the light bundle transmitted by said objective lenses, and wherein said shell defines an internal arcuate mirror edge-receiving surface for each of said mirrors, and a portion of the edge of each mirror is adhesively secured to the said receiving surface therefor by an elastic adhesive.

2. A binocular as described in claim 1 and in which the body shell exactly conforms to the changing cross section of the light bundle, eliminating extra weight and waste space.

3. A binocular as described in claim 1 and in which the mirrors are extremely thin, of the order of 1.0 mm in thickness.

4. In a binocular including a pair of telescopes each having a hollow body shell, a plurality of mirrors in said shell and arranged to provide a folded light path therethrough, and eyepiece and objective lenses mounted on said shell at opposite ends of said light path, the improvement wherein said mirrors are used fully to the edge, precisely oval in shape and sized within ½ millimeter on all edges exactly to conform to the respective cross sections thereat of the light bundle transmitted by said objective lenses, said shell defines at least one elongated opening for inserting a pair of said mirrors through the opening and into the shell and defines a pair of internal arcuate mirror edge-receiving surfaces adjacent to opposite ends of said opening for mounting opposite ends of the mirrors on respective surfaces with the reflective surfaces of the mirrors angularly related to one another, and the edges only of said mirror ends are adhesively secured to the said mounting surfaces therefor by an elastic adhesive.

5. A binocular as defined in claim 4 and wherein said adhesive has an elastomeric base.

6. A binocular as defined in claim 5 and wherein said base comprises neoprene.

7. A binocular as defined in claim 4, 5 or 6 and including a cover mounted on said shell in spaced apart relation to said pair of mirrors and closing said opening.

8. A binocular as defined in claim 7 and wherein said shell and said cover are formed of plastic, and said cover is welded to said shell.

9. A binocular as defined in claim 1 and wherein the spacing apart of the mirrors is such that the extreme outer surfaces of the concave eyelens project a horizontal line which intersects the eyelens end of the largest (objective) mirror and the convex surface of the outermost objective element is on a tangential line intersecting the objective end of the second largest (eyepiece) mirror, to the end that the binocular is made the shortest possible.

* * * * *